(12) United States Patent
Harley et al.

(10) Patent No.: US 8,160,453 B1
(45) Date of Patent: Apr. 17, 2012

(54) PROTECTION SWITCHING WITH TRANSMITTER COMPENSATION FUNCTION

(75) Inventors: James Harley, Nepean (CA); Gerard Swinkels, Ottawa (CA); Michael Watford, Kanata (CA)

(73) Assignee: Rockstar Bidco, LP, New York, NY (US)

( * ) Notice: Subject to any disclaimer, the term of this patent is extended or adjusted under 35 U.S.C. 154(b) by 737 days.

(21) Appl. No.: 11/392,908

(22) Filed: Mar. 30, 2006

(51) Int. Cl.
*H04B 10/04* (2006.01)

(52) U.S. Cl. ............ 398/158; 398/5; 398/147; 398/159; 398/193

(58) Field of Classification Search .......... 398/140–172, 398/4–5
See application file for complete search history.

(56) References Cited

U.S. PATENT DOCUMENTS

| | | | | |
|---|---|---|---|---|
| 5,069,521 A * | 12/1991 | Hardwick | | 385/24 |
| 5,430,568 A * | 7/1995 | Little et al. | | 398/81 |
| 5,510,917 A * | 4/1996 | Corke et al. | | 398/34 |
| 5,539,564 A * | 7/1996 | Kumozaki et al. | | 398/2 |
| 5,559,622 A * | 9/1996 | Huber et al. | | 398/5 |
| 5,608,562 A * | 3/1997 | Delavaux et al. | | 398/148 |
| 5,877,879 A * | 3/1999 | Naito | | 398/91 |
| 6,026,204 A * | 2/2000 | Chbat | | 385/24 |
| 6,128,111 A * | 10/2000 | Roberts | | 398/29 |
| 6,292,602 B1 * | 9/2001 | Suzuki | | 385/24 |
| 6,351,323 B1 * | 2/2002 | Onaka et al. | | 398/84 |
| 6,414,765 B1 * | 7/2002 | Li et al. | | 398/5 |
| 6,556,319 B2 * | 4/2003 | Feinberg et al. | | 398/5 |
| 6,690,889 B2 * | 2/2004 | Desthieux et al. | | 398/147 |
| 6,738,584 B1 * | 5/2004 | Tsuda et al. | | 398/147 |
| 6,771,904 B1 * | 8/2004 | Sasaki et al. | | 398/25 |
| 6,778,782 B1 * | 8/2004 | Watley et al. | | 398/147 |
| 6,931,176 B2 * | 8/2005 | Kelly | | 385/24 |
| 6,934,469 B2 * | 8/2005 | Feinberg et al. | | 398/5 |
| 6,934,479 B2 * | 8/2005 | Sakamoto et al. | | 398/193 |
| 6,941,045 B2 * | 9/2005 | Doerr | | 385/39 |
| 6,961,492 B2 * | 11/2005 | Doerr | | 385/39 |
| 6,965,735 B2 * | 11/2005 | Wu et al. | | 398/12 |
| 6,980,711 B2 * | 12/2005 | Feinberg et al. | | 385/16 |
| 7,058,311 B1 * | 6/2006 | Islam et al. | | 398/140 |
| 7,065,303 B1 * | 6/2006 | Kerem | | 398/197 |
| 7,099,578 B1 * | 8/2006 | Gerstel | | 398/5 |
| 7,099,597 B2 * | 8/2006 | Saunders et al. | | 398/193 |
| 7,113,709 B2 * | 9/2006 | Kawasumi | | 398/208 |
| 7,120,359 B2 * | 10/2006 | Way | | 398/59 |
| 7,174,096 B2 * | 2/2007 | Berthold et al. | | 398/5 |
| 7,197,241 B2 * | 3/2007 | Weston-Dawkes et al. | | 398/5 |
| 7,242,860 B2 * | 7/2007 | Ikeda et al. | | 398/5 |
| 7,242,865 B2 * | 7/2007 | Hasuo et al. | | 398/37 |

(Continued)

FOREIGN PATENT DOCUMENTS

WO   PCT/CA03/01044   4/2004

*Primary Examiner* — Danny Leung

(74) *Attorney, Agent, or Firm* — Louis B. Allard; Borden Ladner Gervais LLP

(57) ABSTRACT

A method of protection switching between first and second transceivers where dispersion compensation is effected electrically in the transmitters. The method includes detecting, at the second transceiver, a signal failure of a signal transmitted from the first transceiver and, upon detecting the signal failure, signalling the first transceiver to change its compensation function. The signalling can be done by encoding overhead bits in a signal transmitted from the second to the first transceiver. Another method of protection switching includes both transceivers toggling alternate reception paths upon detecting a signal failure and changing their dispersion compensation function to that of their respective alternate path.

10 Claims, 6 Drawing Sheets

U.S. PATENT DOCUMENTS

| | | | |
|---|---|---|---|
| 7,302,192 B2 * | 11/2007 | Elahmadi et al. | 398/190 |
| 7,340,170 B2 * | 3/2008 | Park et al. | 398/67 |
| 7,352,971 B2 * | 4/2008 | Roberts et al. | 398/147 |
| 7,359,645 B2 * | 4/2008 | Miyashita et al. | 398/147 |
| 7,379,235 B2 * | 5/2008 | Tian et al. | 359/337.5 |
| 7,382,985 B2 * | 6/2008 | Roberts et al. | 398/159 |
| 7,415,205 B2 * | 8/2008 | Shin et al. | 398/5 |
| 7,447,424 B2 * | 11/2008 | Hovakimyan et al. | 396/4 |
| 7,450,239 B2 * | 11/2008 | Uehara et al. | 356/451 |
| 7,483,629 B2 * | 1/2009 | Weston-Dawkes et al. | 398/5 |
| 2002/0131711 A1 * | 9/2002 | Tanaka et al. | 385/39 |
| 2003/0128978 A1 * | 7/2003 | Hemenway et al. | 398/2 |
| 2003/0161629 A1 * | 8/2003 | Frascolla et al. | 398/5 |
| 2004/0067064 A1 * | 4/2004 | McNicol et al. | 398/158 |
| 2004/0105682 A1 * | 6/2004 | Roberts et al. | 398/147 |
| 2004/0197103 A1 * | 10/2004 | Roberts et al. | 398/159 |
| 2005/0123305 A1 * | 6/2005 | Kawasumi | 398/147 |
| 2005/0135612 A1 * | 6/2005 | Evans | 380/43 |
| 2007/0071447 A1 * | 3/2007 | Ozaki et al. | 398/147 |

* cited by examiner

PROTECTION SWITCHING WITH TRANSMITTER COMPENSATION FUNCTION

CROSS-REFERENCE TO RELATED APPLICATIONS

This is the first application filed for the present invention.

FIELD OF THE INVENTION

The present invention relates generally to protection switching in optical communication systems. More particularly, the present invention relates to protection switching in optical communication systems that compensate for dispersion.

BACKGROUND OF THE INVENTION

Optical communications systems typically include network nodes that can be connected by multiple concatenated optical components, including optical fibre spans (e.g., of 40-150 km in length) interconnected by optical amplifiers. Within each network node, optical signals are converted into electrical signals for signal regeneration and/or routing, and subsequently converted into optical signals for transmission to another network node.

The use of concatenated optical amplifiers within an optical path enables improved signal reach, i.e. the distance that an optical signal can be conveyed before having to be regenerated. However, signal degradation due to, e.g., noise, dispersion effects, non-linear effects and self-phase modulation increase as the optical signal propagates along the optical path and can become significant limiting factors of the signal reach.

One commonly used method of addressing the problem of dispersion in high-bandwidth communications systems is by inserting one or more optical dispersion compensators, within the optical path. Such dispersion compensators may, for example, take the form of length of fibre, a Mach Zehnder interferometer, an optical resonator, or a Bragg reflector. However the deployment of such optical dispersion compensators adds expense to the optical network.

Optical path chromatic dispersion compensation effected in the electrical domain of transmitters and receivers is described, e.g., in U.S. Patent Application Publication No. 2004/0067064 to McNicol et al., which is incorporated herein by reference. Such a technique reduces the cost of optical communication systems, as the costly optical dispersion compensators are not required.

Protection switching between two nodes for protecting against a signal failure in a given optical path is known in the art. One form of protection switching involves providing first and second distinct optical paths for respective first and second transmitter/receiver pairs for each of the two transmission directions. That is to say that four transmitters, four receivers and four optical paths are required for protection switching between two nodes. This is a costly proposition since transmitters and receivers are usually the most expensive parts of communications systems. Upon a signal failure being detected on a path, the client at the receiving end must enable the other of its two receivers and notify the transmitter end to enable its other transmitter.

Another form of prior art protection switching involves providing first and second distinct optical paths for a single transmitter/receiver pair for each of the two transmission directions, with the option of providing optical dispersion compensation in the paths. That is to say that two transmitters, two receivers and four optical paths are required for protection switching between two nodes. For each of the two transmission directions, a client is connected to a single transmitter and to a single receiver. The output of each transmitter of a given client is connected to a 1×2 splitter whose two outputs are connected via optical paths to a 2×1 optical switch, which is connected to the receiver of another client. Upon receiving a failed signal a first optical path, the client at the receiving end signals its switch to enable the other optical path. This is type of protection switching is termed unidirectional protection switching and requires a switching of paths at the receiving end only. This approach to protection switching is more affordable than the previously described approach.

However unidirectional protection switching is not possible in the case where dispersion compensation is effected at the transmitter end since the dispersion for which the transmitter compensates is typically different in the protection path compared to the working (i.e. main) path. Consequently, a single transmitter cannot transmit the same signal on both the working path and the protection path, while compensating for dispersion or other optical effects, as the dispersion is typically different in each path. Thus, such a unidirectional switching approach requires costly optical dispersion compensators deployed in each of the optical paths whenever dispersion compensation is required.

Therefore, it is desirable to provide affordable protection switching in communication systems having compensation enabled transmitters.

SUMMARY OF THE INVENTION

It is an object of the present invention to obviate or mitigate at least one disadvantage of previous protection switching systems and methods.

One aspect of the invention allows for compensation enabled transmitters to be used in unidirectional protection switching systems, without the need for costly optical dispersion compensators to be deployed in each of the optical paths. Accordingly, as single transmitter can be used to transmit a signal on both a working path and a protection path. The transmitter is operable to compensate for the dispersion along either path. During normal operation, the transmitter compensates for dispersion along the working path, and the receiver receives the signal from the working path. The transmitter is adapted to switch the compensation function used to compensate for dispersion, so that in the event of a protection switch, the transmitter can compensate for the dispersion along the protection path. Accordingly, when signal failure is detected at the receiver, the receiver requests the transmitter to change its compensation function to that of the other optical path selected at the receiver end. More generally, in some embodiments the transmitter performs a more general electrical optical path compensation function which compensates for dispersion and for other sources of signal degradation, such as polarization dependent effects (e.g., Polarization Mode Dispersion and Polarization Dependent Loss), non-linear effects and self-phase modulation. For example, reference is made to U.S. Patent Application Publication No. 2004/0067064 to McNicol et al., U.S. Patent Application Publication No. 20040105682 to Roberts, et al., and U.S. Patent Application Publication No. 20040197103 to Roberts, et al., and International Patent Application No. PCT/CA03/01044 filed Jul. 11, 2003 each of which is incorporated herein by reference, which describe predistortion of an input signal x(t) in accordance with a compensation function C(t) which substantially compensates impairments of the optical communications link.

In a first aspect, the present invention provides method of protection switching between first and second transceivers. The method comprises steps of detecting a signal failure of a first signal transmitted from the first transceiver on a first channel with the first signal having a compensation function for the first channel. This is followed by notifying the first transceiver to change the compensation function for the first signal to a compensation function for a second channel.

In a further aspect the present invention provides a method of protection switching between first and second transceivers. This method comprises steps of, at the second transceiver, detecting a signal failure of a first signal transmitted from the first transceiver on a first channel, where the first signal has a compensation function for the first channel. This is followed by a step of changing reception from the first transceiver from the first channel to a second channel. The method also includes steps of, at the first transceiver, detecting a signal failure of a second signal transmitted from the second transceiver on a third channel, where the second signal has a compensation function for the third channel. This is followed by a step of changing reception from the second transceiver from the third channel to a fourth channel.

In a further aspect, the present invention provides a protection switching system. The system comprises a first transceiver having a first transmitter, a first receiver, a first electrical optical path compensation module and a first protection processor. The system further comprises a second transceiver having a second transmitter, a second receiver, a second electrical optical path compensation module and a second protection processor. Connecting the first and second transceivers are first, second, third and fourth optical paths with the first and fourth optical paths for propagating optical signals from the first transmitter to the second receiver, and the second and third optical paths for propagating other optical signals from the second transmitter to the first receiver. Also comprised in the system are first and second optical couplers. The first optical coupler is for coupling a first optical signal from the first transmitter to the first and fourth optical paths and the second optical coupler is for coupling a second optical signal from the second transmitter to the second and third optical paths. Additionally, the system comprises first and second optical switches. The first optical switch is for selecting either the first or the fourth optical path for connection to the second receiver and the second optical switch is for selecting either the second or the third fourth optical path for connection to the first receiver. In the system, the first and second electrical optical path modules are for generating compensation signals for the first and fourth optical paths and for the second and third optical paths respectively. The first and second protection processor are for toggling the first and second optical switches respectively upon detecting a signal failure at the first and second receivers respectively, and for signalling the first and second electrical optical path compensation module to change their dispersion compensation function to the dispersion compensation function of the optical path enabled by the respective optical switches.

In a further aspect, the present invention provides a first node for communication with a second node in an optical network. The second node is adapted to transmit a signal to the first node on a main channel and a protection channel and to use a compensation function for compensating for dispersion. The compensation function depends on whether the signal is to be received by the first node from the first channel or from the second channel. The first node comprises a receiver for receiving an optical signal transmitted from another node where the receiver is capable of receiving the signal from either the main channel or the protection channel. The receiver is operable to detect a signal failure on the main channel. The first node further comprises a transmitter for transmitting a notification to the second node to change the compensation function for the optical signal from that of the main channel to that of the protection channel.

In a further aspect, the present invention provides a receiving node for an optical network. The receiving node comprises a receiver for receiving an optical signal transmitted from a transmitting node. The receiver is capable of receiving the signal from either a main channel or a protection channel. The receiving node further comprises a transmitter for transmitting an instruction to said the transmitting node to change a compensation function for the optical signal from a main channel compensation function to a protection channel compensation function.

In a further aspect, the present invention provides transmitting node for an optical network. The transmitting node comprises a transmitter for transmitting an optical signal to a receiving node. The transmitter is capable of transmitting the signal on either a main channel or a protection channel. The transmitting node further comprises a receiver for receiving an instruction from the receiving node to change a compensation function for the optical signal from a main channel compensation function to a protection channel compensation function.

It should be noted that embodiments of the invention are described with reference to dispersion compensation. However the invention is also applicable to other degradations of the optical signal, for example, as caused by non-linear effects and/or self-phase modulation.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for protection switching where unidirectional protection switching is not feasible. The system in which the method is implemented, according to an embodiment of the invention, includes two transceivers each having a optical path compensator module enabling a transmitter for compensating for effects such as, chromatic dispersion in the optical paths linking the first and second transceivers. The protection switching method includes steps of, at the second transceiver, notifying the first transceiver of a signal failure detected at the second transceiver and switching the signal reception path from the optical path on which the signal failure was detected to another optical path and, at the first transceiver, upon receiving the notification from the second transceiver, changing the transmitter compensation function to that of the other optical path. It should be noted that embodiments are described herein with reference to the example of dispersion compensation. However it should be noted that the optical path compensation function or module can compensate for other sources of signal degradation on an optical path basis, for example, chromatic dispersion, Polarization Mode Dispersion (PMD), Polarization Dependent Loss (PDL), non-linear effects and/or self-phase modulation.

Figure 1:
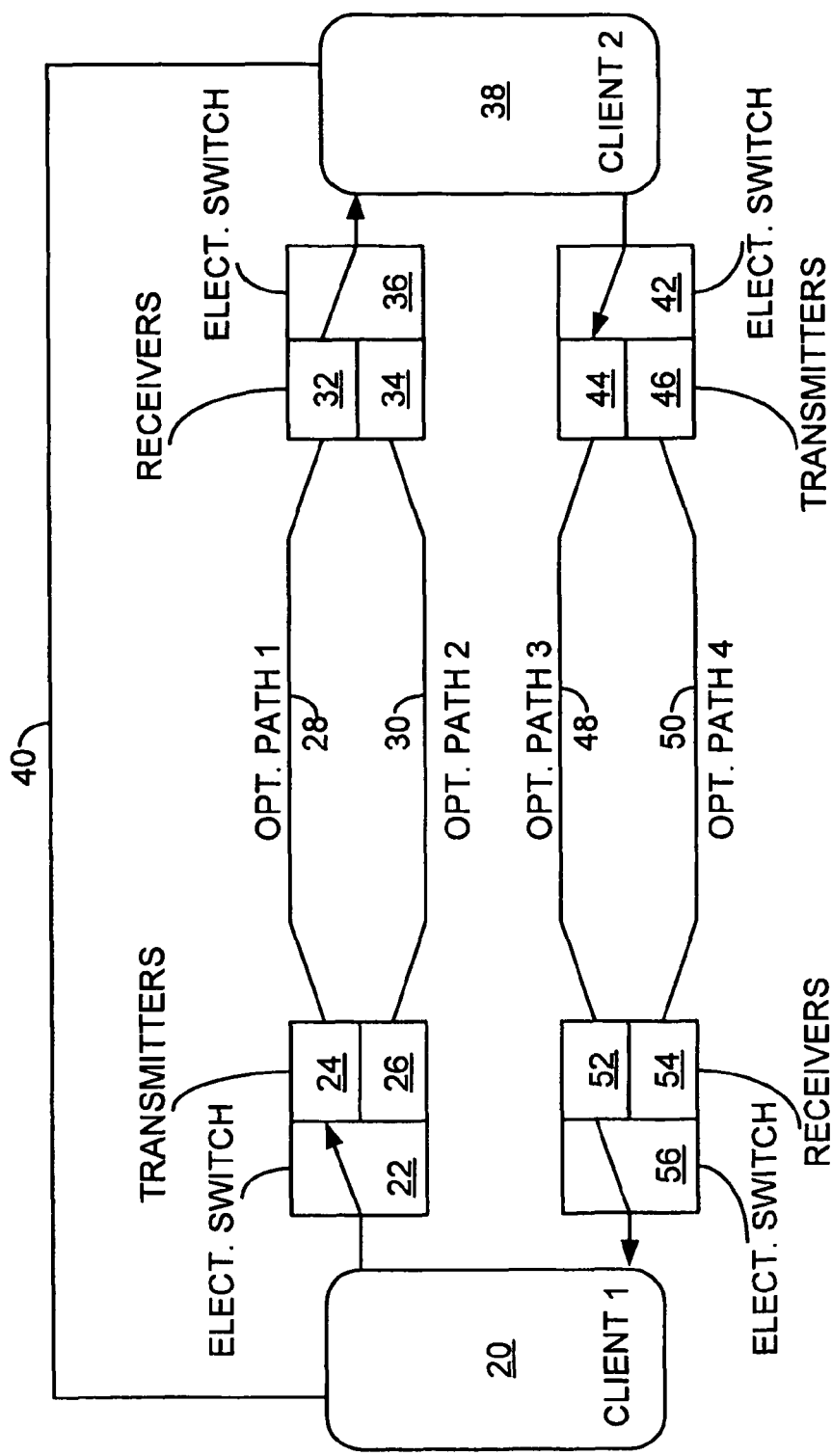
FIG. 1 is a prior art embodiment of protection switching.

FIG. 1 shows a prior art approach to protection switching. In FIG. 1 a first client 20 is connected to an electrical switch 22 shown as enabling a transmitter 24. The transmitter 24 transmits an optical signal through a first optical path 28 and the optical signal is detected by receiver 32 connected to a second client 38 via an electrical switch 36. Upon the receiver 32 detecting a signal failure, a processor of the second client 38 can electrically signal a processor of the first client 20 via electrical path 40 to enable transmitter 26 to transmits an optical signal through a second optical path 30. Alternatively, the processor of the second client 38 can optically signal the processor of the first client 20 by using overhead bits in an optical signal transmitted from the second client 38 to the first client 20 along a third optical path 48 as described below. The processor of the second client 38 also signals the electrical switch 36 to enable the receiver 34.

The second client is connected to an electrical switch 42 shown as enabling a transmitter 44. The transmitter 44 transmits an optical signal through a third optical path 48 and the optical signal is detected by receiver 52 connected to the first client 20 via an electrical switch 56. If the receiver 52 detects a signal failure of the optical signal, the processor of the first client 20 can electrically signal the processor of the second client 38 via the electrical path 40 or, optically via an optical signal transmitted from the first client 20 to the second client 38, to enable transmitter 46 to transmit another optical signal through a fourth optical path 50. Not shown in the prior art embodiment of FIG. 1, is that dispersion compensation can be effected either optically in the optical paths using conventional dispersion compensators, or in the electrical domain of the transmitters and/or receivers.

Figure 2:
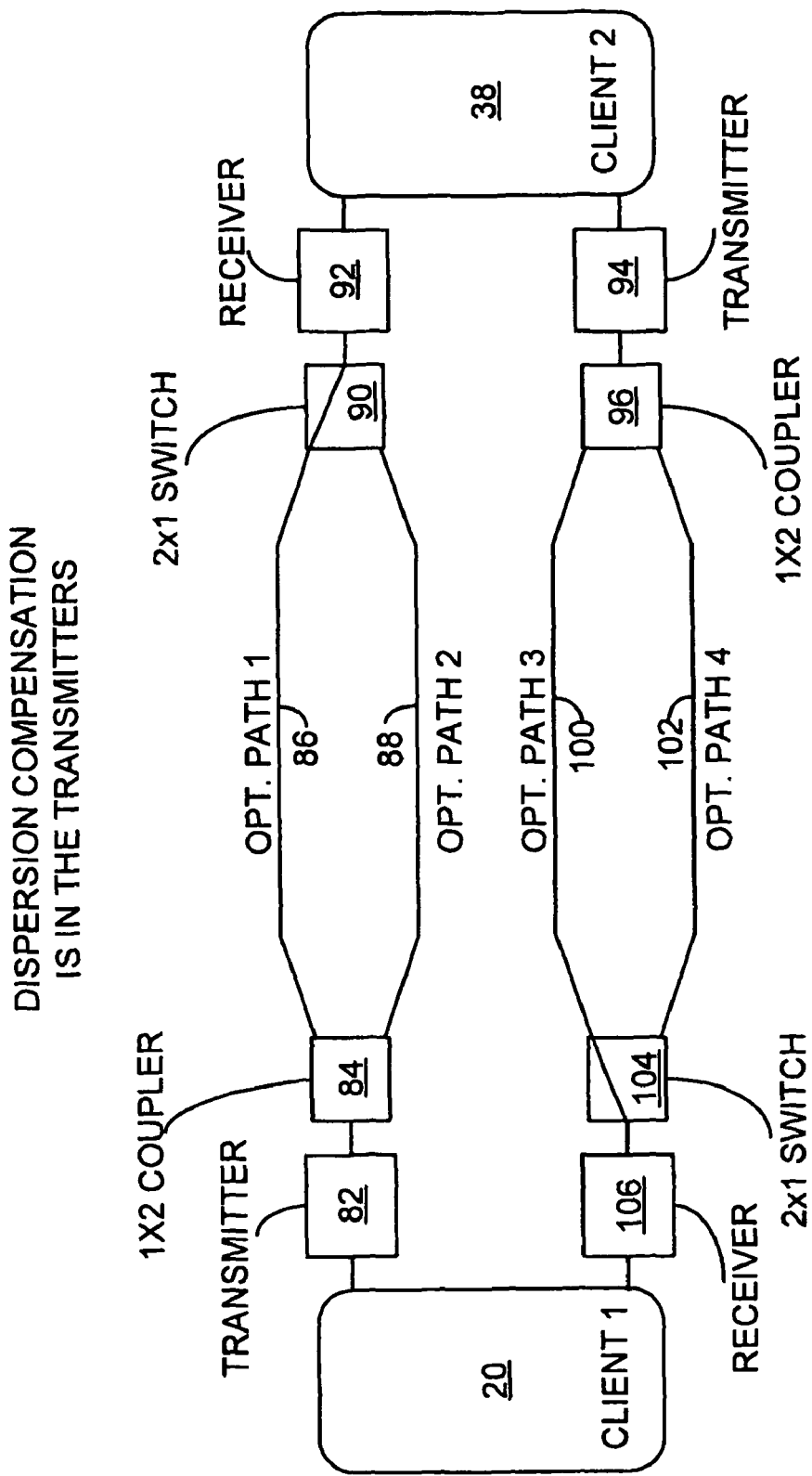
FIG. 2 is an embodiment of protection switching of the present invention.

FIG. 2 depicts an embodiment of the present invention. There, a first client 20 is connected to a transmitter 82 capable of transmitting an optical signal compensating for deleterious effects such as chromatic dispersion, non-linear effects and/or self-phase modulation for either an optical path 86 or an optical path 88. The transmitter 82 is connected to an input of a 1×2 optical coupler 84 whose two outputs are connected to the optical paths 86 and 88. The optical path 86 is connected to an input of a 2×1 optical switch 90 while the optical path 88 is connected to another input of the 2×1 optical switch 90. The output of the 2×1 optical switch 90 is connected to a receiver 92 in communication with a second client 38. The receiver 92 is depicted as receiving the optical signal stemming from optical path 86. In the direction going from the transmitter 82 (94) to the receiver 92 (106), the optical path 86 (100) is the main path and the optical path 88 (102) is protection path.

Also depicted in the embodiment of FIG. 2 is the second client 38 connected to a transmitter 94, which is capable of transmitting an optical signal compensating for chromatic dispersion, non-linear effects and/or self-phase modulation for either an optical path 100 or an optical path 102. The transmitter 94 is connected to an input of a 1×2 optical coupler 96 whose two outputs are connected to optical paths 100 and 102. The optical path 100 is connected to an input of a 2×1 optical switch 104 while the optical path 102 is connected to another input of the 2×1 optical switch 104. The output of the 2×1 optical switch 104 is connected to a receiver 106 in communication with the first client 20. The receiver 106 is depicted as receiving the optical signal stemming from optical path 100.

The optical paths 86, 88, 100 and 102 can have different optical characteristics, which indicates that different compensation functions must be available to the transmitters 82 and 94 for each of the optical paths. In order for an optical signal to be received successfully at the receiver 92, an optical signal transmitted from the transmitter 82 along the optical paths 86 and 88 must be such that its transmission compensation function corrects for the chromatic dispersion, non-linearity, and/or self-phase modulation of the optical path whose output is received by receiver 92. Otherwise, a signal failure can result at the receiver 92, the failure being, e.g., a bit error rate failure. Similarly, in order for an optical signal to be received successfully at the receiver 106, an optical signal transmitted from the transmitter 94 along the optical paths 100 and 102 must be such that its transmission compensation function corrects for the chromatic dispersion and/or non-linearity of the optical path whose output is received by receiver 106. A depiction of how compensated transmission functions are generated and how protection switching is effected is shown in FIGS. 3A and 3B.

Figure 3A:
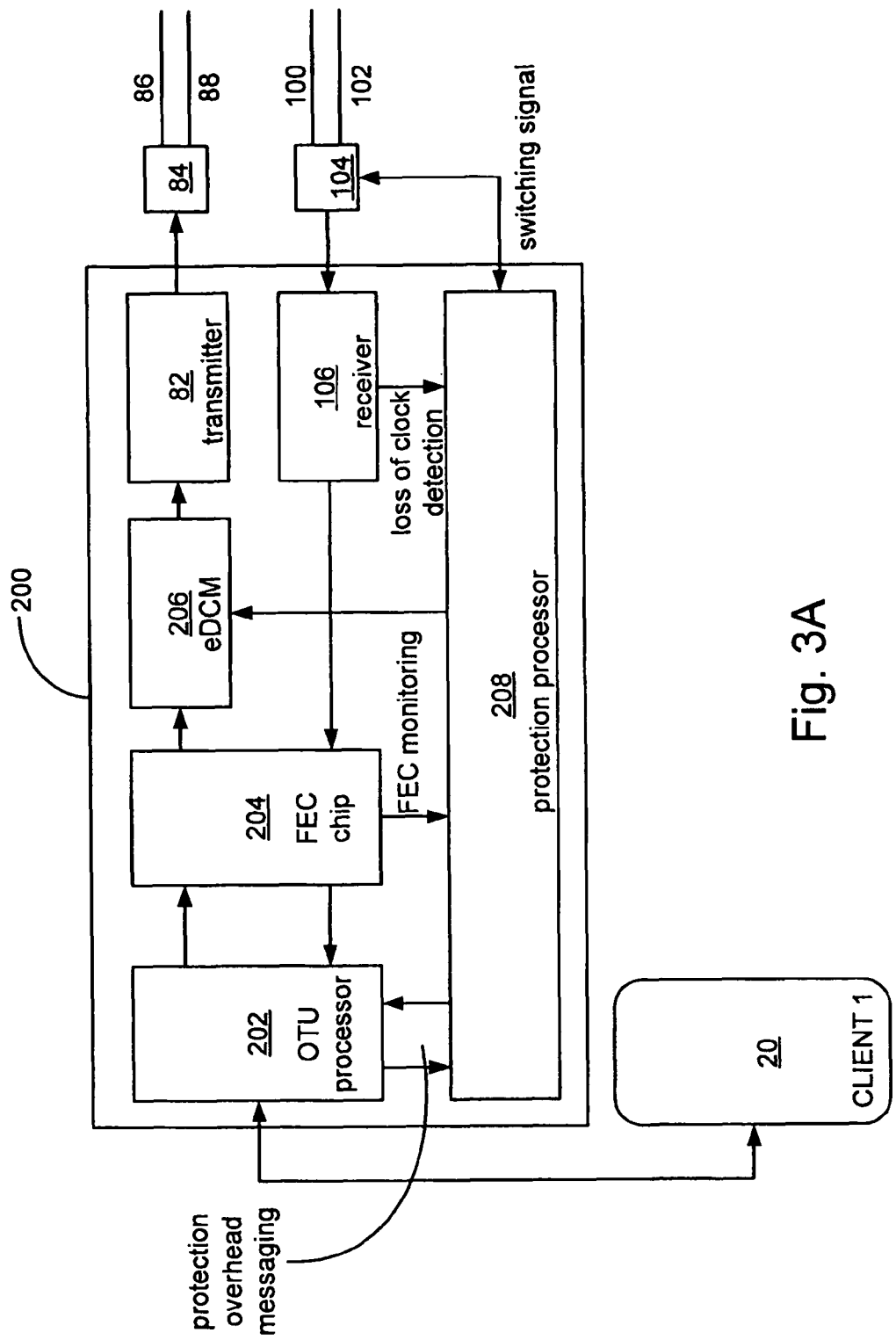
FIGS. 3A and 3B are embodiments of transceivers of the present inventions.

In FIG. 3A, a transceiver module 200 is connected to the first client 20, which can be a constant bit rate client. Transceiver modules such as transceiver module 200 are part of network nodes for use in the protection switching system and method of the present invention. The transceiver module 200 includes the transmitter 82 and the receiver 106 previously depicted in FIG. 2. The first client 20 wishing to transmit data provides an input to an optical transport unit (OTU) overhead processor 202, which in turn provides the processed data to a forward error correction (FEC) chip 204. The data processed by the FEC chip 204 is then provided to an electrical domain compensation module (eDCM) 206, which provides an input to the transmitter 82. It is to be noted that the eDCM can be of the type described in U.S. Patent Publication Number 2004/0067064 to McNicol et al. The transceiver module 200 can also receive an optical signal at the receiver 106. The detected signal is provided by the receiver 106 to a protection processor 208 in order to detect a loss of clock. The detected signal is also provided by the receiver 106 to the FEC chip 204, which provides a processed detected signal to the OTU overhead processor 202. Both the OTU overhead processor 202 and the FEC chip 204 operate in cooperation with the protection processor 208. Another transceiver module 210, similar to the transceiver module 200 and connected to the second client 38 of FIG. 2, includes the receiver 92 and the transmitter 94 of FIG. 2 and is shown in FIG. 3B. The transceiver module 210 also includes an OTU processor 212, an FEC chip 214, an eDCM 216 and a protection processor 218, all of which operate in the same way as their counterparts of the transceiver module 200. As will be understood by a worker skilled in the art, communication protocols other than those related to OTUx overhead can also be used to implement the present invention, such protocols including, but not restricted to, SONET.

Important to note is that the eDCMs 206 and 216 are configured with selectable compensation functions for each of the optical paths connected to each eDCM's respective transmitter. That is to say, that eDCM 206 is configured to compensate selectively at least for deleterious effects in optical paths 86 and 88 and that eDCM 216 is configured to compensate selectively at least for deleterious effects in optical paths 100 and 102.

Figure 3B:
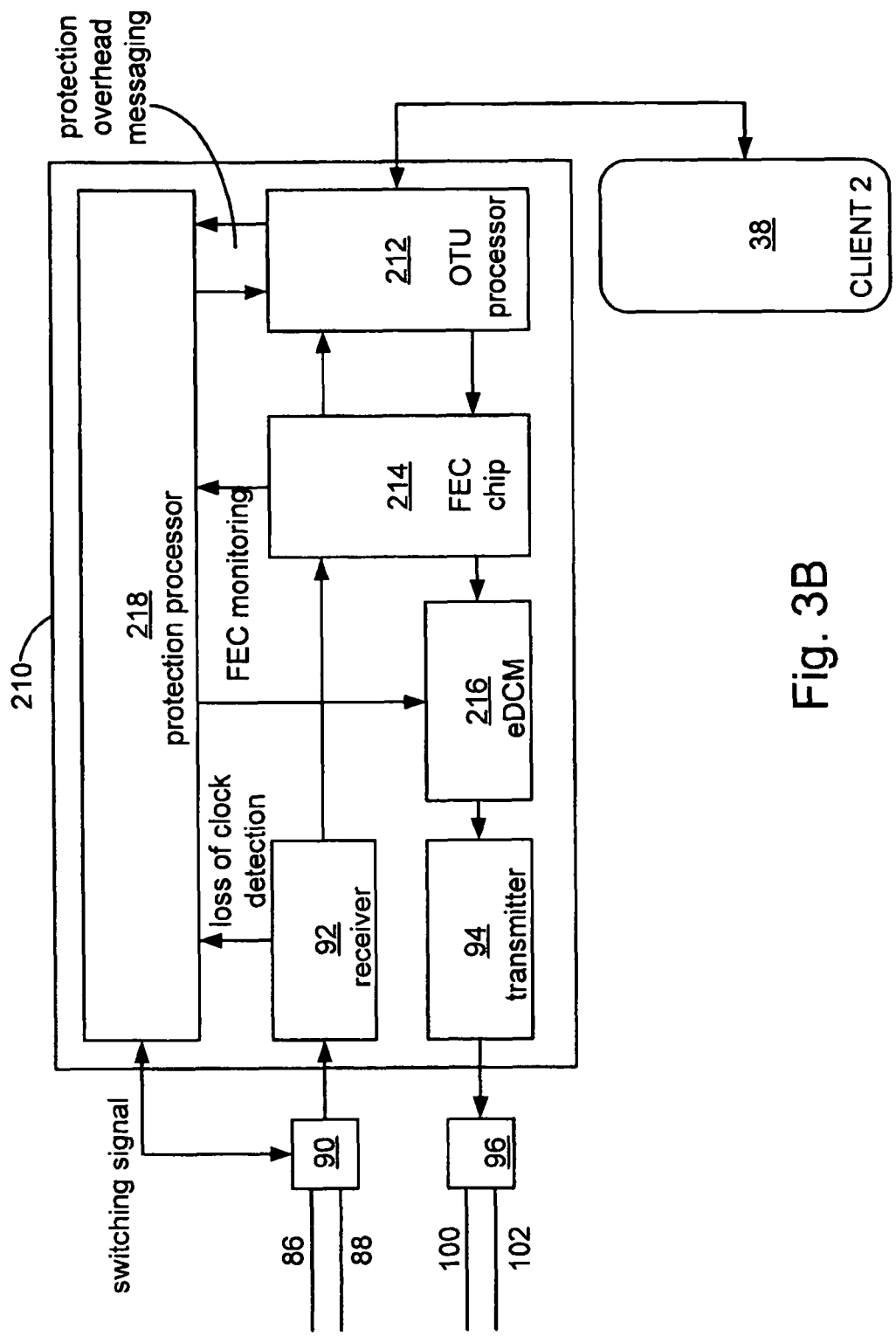
Figure 4:
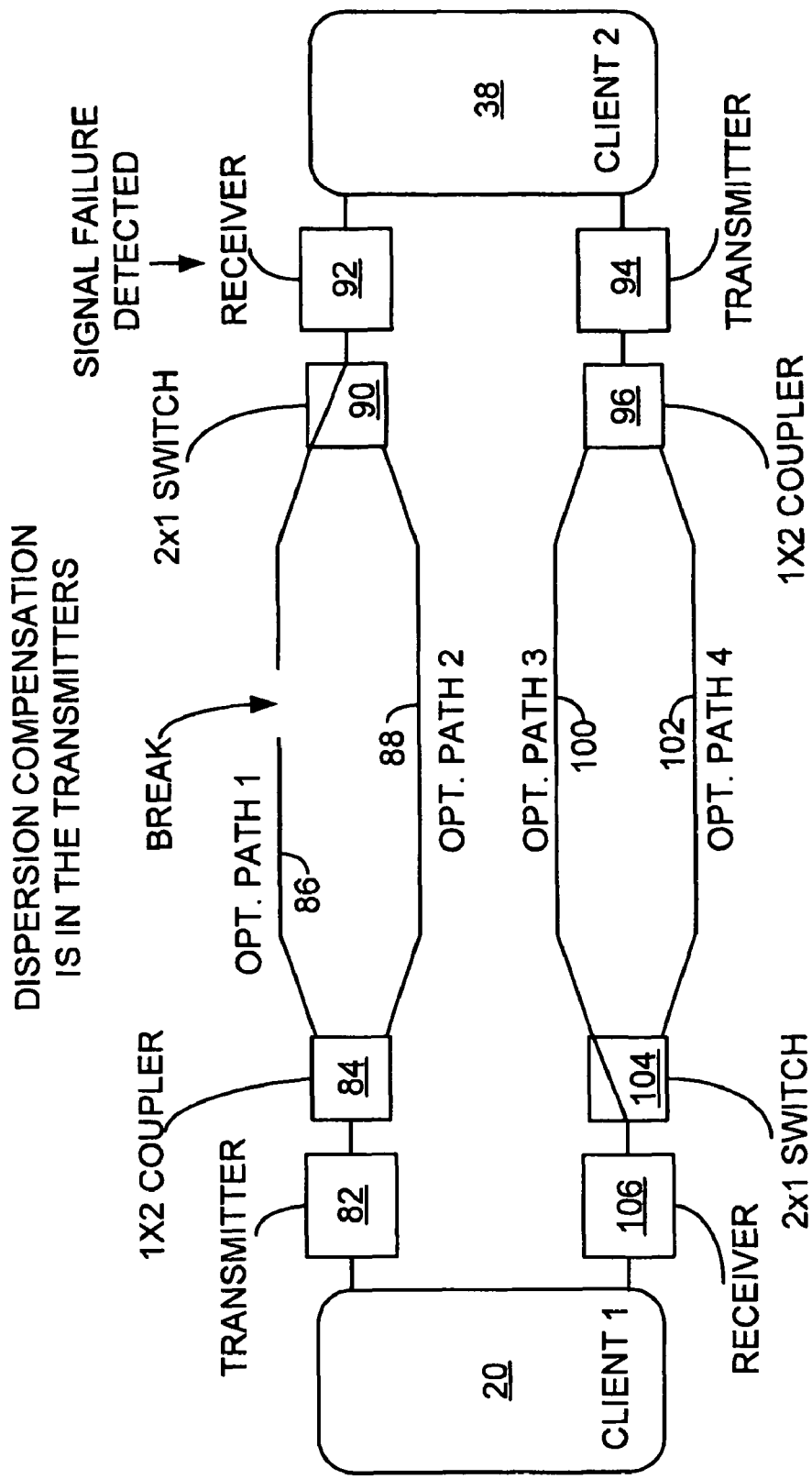
FIG. 4 is a depiction of a break in an optical path in the embodiment of FIG. 2.

With respect to FIGS. 2, 3A and 3B, in the event of a failure of the optical path 86, the transceiver module 210 will detect a signal failure. In the case where the signal failure is due to a break in the optical path 86 as depicted in FIG. 4., the protection processor 218 signals the 2×1 switch 90 to connect the optical path 88 to the receiver 92, which will allow the optical signal transmitted by the transmitter 82 to reach the receiver 92. However, since the optical signal that was propagating along the optical path 86 was compensated for the optical path 86 and that the optical signal propagating along optical path 88 is still compensated for optical path 86, a signal failure (e.g., based on BER) will likely still be detected at the receiver 92, due to the difference in compensation functions between paths 86 and 88. It is clear that a unidirectional protection switching scheme is unreliable in this case, unless the dispersion characteristics of the two paths are very closely matched. That is, adapting only the receiving end or the transmitting end of a failed optical path would generally not result in a signal restoration. The signal failure in this case can be resolved by the following additional steps.

In a first case, upon the transceiver module 210 detecting a signal failure of the optical signal propagating on the optical path 86, the protection processor 218 toggles the 2×1 switch 90 to connect the optical path 88 to the receiver 92. Additionally, when working with the OTUx overhead protocol, the protection processor 218 encodes overhead bits in the signal transmitted by the transmitter 94 along the optical path 100 to signal the eDCM 208 to change its compensation function to that of the optical path 88. The net result is that the signal transmitted from the transceiver 200 to the transceiver 210 now propagates error free along the optical path 88. The signal transmitted from the transceiver 210 to the transceiver 200 still propagates along the optical path 100. As will be understood by a worker skilled in the art and as mentioned earlier, protocols other than OTUx overhead, for example a SONET protocol, can also be used to signal the eDCM 208 to change its compensation function.

In a second case, upon the transceiver module 210 detecting a signal failure of the optical signal propagating on the optical path 86, the protection processor 218 toggles the 2×1 switch 90 to connect the optical path 88 to the receiver 92 and signals the eDCM 216, which had been set to a compensation function proper to the optical path 100, to change its compensation function to that of the optical path 102. The transceiver module 200 receives the signal stemming from optical path 100 and detects a signal failure since the compensation function related to the received optical signal is not that of the optical path 100 along which the received signal propagated. Upon detecting this signal failure, the protection processor 208 toggles the 2×1 switch 104 to connect the optical path 102 to the receiver 106 and, signals the eDCM 206 to change its compensation function to that corresponding to the optical path 88. The net result is that the signal transmitted from the transceiver 200 to the transceiver 210 now propagates error free along the optical path 88 and the signal transmitted from the transceiver 210 to the transceiver 200 propagates along the optical path 102.

Another way to notify the eDCM 206 to change its compensation function upon the transceiver module 210 detecting a signal failure is to transmit a signal from the transceiver module 210 to the transceiver module 200 via an external communication network (not shown) connected to transceiver modules 200 and 210.

Figure 5:
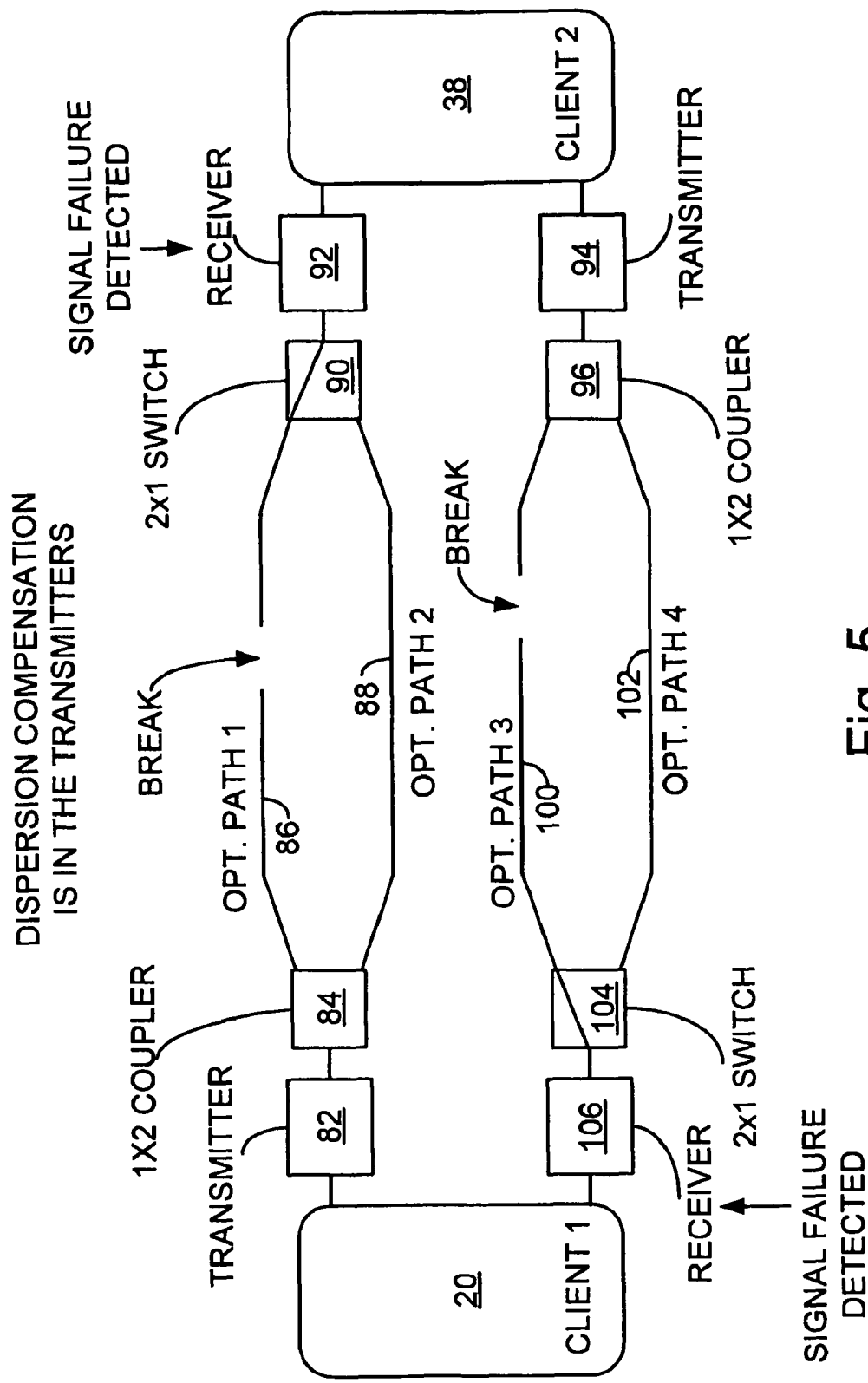
FIG. 5 is a depiction of a break in two optical paths in the embodiment of FIG. 2.

FIG. 5 depicts a scenario where the optical paths 86 and 100 suffer a break. This can be a common occurrence since in the switching system depicted, optical paths between transceiver modules will usually have a common section or will be in close proximity to each other. That is to say, the physical medium of the optical path 86 (88) can be laid next to the physical medium of the optical path 100 (102), or that the optical path 86 (88) can share a common physical medium with the optical path 100 (102) for portion of the link linking transceivers 200 and 210. In such cases, a break in the optical path 86 (88) usually entails a break in the optical path 100 (102). For this reason, optical paths connected to the same transmitter are usually deployed at sufficient distance from one another in order to minimize the chance of having both of them broken at the same time.

In the scenario of FIG. 5, the receivers 92 and 106 and their respective transceiver modules 200 and 210 each detect a signal failure, which results in the protection processors 208 and 218 toggling respectively the 2×1 optical switches 104 and 90 to direct the optical signal stemming from the optical path 102 to receiver 106 and the optical signal stemming from the optical path 88 to the receiver 92. At this point, using overhead signalling or, e.g., SONET signalling, is not possible since the signals propagating along the optical paths 88 and 102 upon the optical switches 90 and 104 having been toggled are compensated for optical paths 86 and 100 and are received as failed signals at transceiver modules 210 and 200 respectively. To circumvent this problem, the second case scenario described above can be used. As will be understood by a skilled worker in the art, signalling between the transceiver modules 200 and 210 can also be enabled by an external communication network (not shown) although the efficiency and robustness of such signalling may leave something to be desired.

In the preceding description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored on a machine-readable medium (also referred to as a computer-readable medium, a processor-readable medium, or a computer usable medium having a computer readable program code embodied therein). The machine-readable medium may be any type of magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks.

Those skilled in the art should further appreciate that in some embodiments of the invention, all or part of the functionality previously described herein with respect to protection switching may be implemented as pre-programmed hardware or firmware elements (e.g., application specific integrated circuits (ASICs), electrically erasable programmable read-only memories (EEPROMs), etc.), or other related components.

Those skilled in the art will further appreciate that the series of instructions may be written in a number of programming languages for use with many computer architectures or operating systems. For example, some embodiments may be implemented in a procedural programming language (e.g., "C") or an object oriented programming language (e.g., "C++" or "JAVA").

Thus, the present invention provides a method and system for protection switching where unidirectional protection switching is not feasible. As described above, the system in which the method is implemented includes two transceivers each having a digital compensator module for compensating chromatic dispersion, non-linear effects and/or self-phase modulation in the optical paths linking the first and second transceivers. The protection switching method presented includes a step of generating a signal failure of a second signal transmitted from the second transceiver to the first transceiver upon having detected a signal failure of a first signal transmitted form the first transceiver and detected at the second receiver. The generation of a signal failure of the optical signal transmitted from the second transmitter includes changing the compensation function for the optical path linking the second transmitter to the second receiver.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of protection switching between first and second transceivers, the method comprising steps of:
    detecting, at the second transceiver, a signal failure of a first signal transmitted from the first transceiver on a first optical path, the first signal having a first compensation function for the first optical path; and
    in response to said signal failure:
        switching reception of said first signal by said second transceiver from said first optical path to a second optical path between said first and second transceivers; and
        signaling to the first transceiver to change the compensation function for the first signal from the first compensation function for the first optical path to a second compensation function for the second optical path;
        said first and second compensation functions depending on optical characteristics of the first and second optical paths, the first and second compensation functions being set by an electrical domain compensation module operationally connected to a transmitter included in the first transceiver.

2. The method of claim 1 wherein, the step of signaling to the first transceiver includes the step of transmitting a second signal from the second transceiver to the first transceiver on a third optical path.

3. The method of claim 2 wherein, the step of transmitting the second signal is preceded by a step of compensating, at the second transceiver, the second signal for the third optical path.

4. The method of claim 3 wherein, the step of transmitting the second signal further includes a step of encoding overhead bits in the second signal, the overhead bits including compensation function change information for the first transceiver.

5. The method of claim 4, wherein the first and second transceivers are optical transceivers, the first and second signals are optical signals.

6. The method of claim 5 wherein, the compensation functions for the first, second and third optical paths are for compensating at least for chromatic dispersion in the first, second, and third optical paths respectively.

7. The method of claim 5, wherein the compensation functions for the first, second and third optical paths are for compensating at least for non-linear effects in the first, second, and third optical paths respectively.

8. The method of claim 5, wherein the compensation functions for the first, second and third optical paths are for compensating at least for self-phase modulation effects in the first, second and third optical paths respectively.

9. The method of claim 5, wherein the step of changing reception from the first transceiver from the first optical path to the second optical path includes a step of toggling a first optical switch.

10. The method of claim 1, wherein each of the paths is a physical medium between the first and the second transceivers.

* * * * *